United States Patent
Rath et al.

(10) Patent No.: US 9,459,844 B2
(45) Date of Patent: Oct. 4, 2016

(54) APPLICATION BUILDING BLOCKS FOR ON DEMAND AND ON PREMISE USAGE

(71) Applicants: Ralf M. Rath, Mannheim (DE); Uwe Reimitz, Wiesloch (DE); Ulrich Roegelein, Gaiberg (DE); Juergen Gatter, Rauenberg (DE); Martina Gozlinski, Wiesloch (DE); Wolfgang G. Mueller, Wiesloch (DE); Dimitar Vangelovski, Heidelberg (DE); Siegfried Peisl, Ketsch (DE)

(72) Inventors: Ralf M. Rath, Mannheim (DE); Uwe Reimitz, Wiesloch (DE); Ulrich Roegelein, Gaiberg (DE); Juergen Gatter, Rauenberg (DE); Martina Gozlinski, Wiesloch (DE); Wolfgang G. Mueller, Wiesloch (DE); Dimitar Vangelovski, Heidelberg (DE); Siegfried Peisl, Ketsch (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 13/904,290

(22) Filed: May 29, 2013

(65) Prior Publication Data
US 2014/0359576 A1   Dec. 4, 2014

(51) Int. Cl.
*G06F 9/44*     (2006.01)
*G06F 9/445*    (2006.01)
*G08G 1/00*     (2006.01)

(52) U.S. Cl.
CPC . *G06F 8/34* (2013.01); *G06F 8/38* (2013.01); *G06F 9/44505* (2013.01); *G08G 1/20* (2013.01)

(58) Field of Classification Search
None
See application file for complete search history.

(56) References Cited

U.S. PATENT DOCUMENTS

| | | | | |
|---|---|---|---|---|
| 3,646,580 | A * | 2/1972 | Fuller | G08G 1/20 340/989 |
| 6,611,755 | B1 * | 8/2003 | Coffee | B28C 5/422 340/438 |
| 6,868,333 | B2 * | 3/2005 | Melen | G01C 21/26 701/482 |
| D596,191 | S | 7/2009 | Rath et al. | |
| 7,823,170 | B2 | 10/2010 | Jolfaei et al. | |

(Continued)

OTHER PUBLICATIONS

Traynor, C., et al., A study of end-user programming for geographic information systems, Papers presented at the seventh workshop on Empirical studies of programmers, 1997, pp. 140-156, [retrieved on May 26, 2016], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Fish & Richardson P.C.

(57) ABSTRACT

A computer-implemented method includes: identifying a map-based application for enhancement, identifying a configuration file defining one or more application parts for enhancing the map-based application, the one or more application parts associated with a second application, and incorporating the one or more application parts from the identified configuration file into the map-based application. In some instances, incorporating the one or more application parts into the map-based application includes identifying a symbol associated with each of the one or more application parts, accessing data from the second application associated with each of the one or more application parts, and inserting an instance of the symbol for each application part based on the accessed data from the second application.

18 Claims, 7 Drawing Sheets

(56) References Cited

U.S. PATENT DOCUMENTS

| | | | |
|---|---|---|---|
| 7,966,603 B2 | 6/2011 | Brunswig et al. | |
| 8,117,255 B2 | 2/2012 | Kolb et al. | |
| 8,370,751 B2 | 2/2013 | Graeff et al. | |
| 8,392,227 B2 | 3/2013 | Brunswig et al. | |
| 8,812,269 B1* | 8/2014 | Orofino, II | G06F 8/34 703/1 |
| 2002/0171650 A1* | 11/2002 | Prabhakaran | G08G 1/202 345/530 |
| 2004/0148090 A1* | 7/2004 | Melen | G01C 21/26 701/482 |
| 2005/0246367 A1 | 11/2005 | Rath | |
| 2006/0129660 A1 | 6/2006 | Mueller et al. | |
| 2009/0063988 A1 | 3/2009 | Graeff et al. | |
| 2010/0070891 A1* | 3/2010 | Creekbaum | G06F 8/34 715/763 |
| 2010/0205040 A1* | 8/2010 | Wiederstein | 705/10 |
| 2010/0218084 A1* | 8/2010 | Sivadas | G06F 9/44505 715/234 |
| 2012/0143896 A1 | 6/2012 | Gatter | |
| 2012/0226440 A1* | 9/2012 | Nagda | G08G 1/202 701/465 |
| 2013/0178257 A1* | 7/2013 | Langseth | 463/4 |
| 2013/0311882 A1* | 11/2013 | McCoy | G06F 8/38 715/703 |
| 2016/0092176 A1* | 3/2016 | Straub | G06F 8/34 717/107 |

OTHER PUBLICATIONS

Kothuri, R., et al., Generating Maps Using MapViewer, Pro Oracle Spatial, 2004, pp. 383-477, [retrieved on May 26, 2016], Retrieved from the Internet: <URL:http://link.springer.com/chapter/10.1007/978-1-4302-0735-1_11>.*

Roegelein, Ulrich; U.S. Appl. No. 13/740,646, filed Jan. 14, 2013 entitled "Rendering Maps with Canvas Elements" 27 pages.

* cited by examiner

APPLICATION BUILDING BLOCKS FOR ON DEMAND AND ON PREMISE USAGE

BACKGROUND

Business applications are generally built in a generic manner to allow a wide range of users and businesses to use the application, without providing specific solutions to individualized solutions. Many users may wish to modify or enhance particular aspects of their particular version of a business application. Currently, expensive consultants and software specialists may be needed to modify and/or customize the business application.

SUMMARY

The disclosure generally describes computer-implemented methods, software, and systems for enhancing visual applications. A computer-implemented method includes: identifying a map-based application for enhancement, identifying a configuration file defining one or more application parts for enhancing the map-based application, the one or more application parts associated with a second application, and incorporating the one or more application parts from the identified configuration file into the map-based application. In some instances, incorporating the one or more application parts into the map-based application includes identifying a symbol associated with each of the one or more application parts, accessing data from the second application associated with each of the one or more application parts, and inserting an instance of the symbol for each application part based on the accessed data from the second application.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Figure 1:
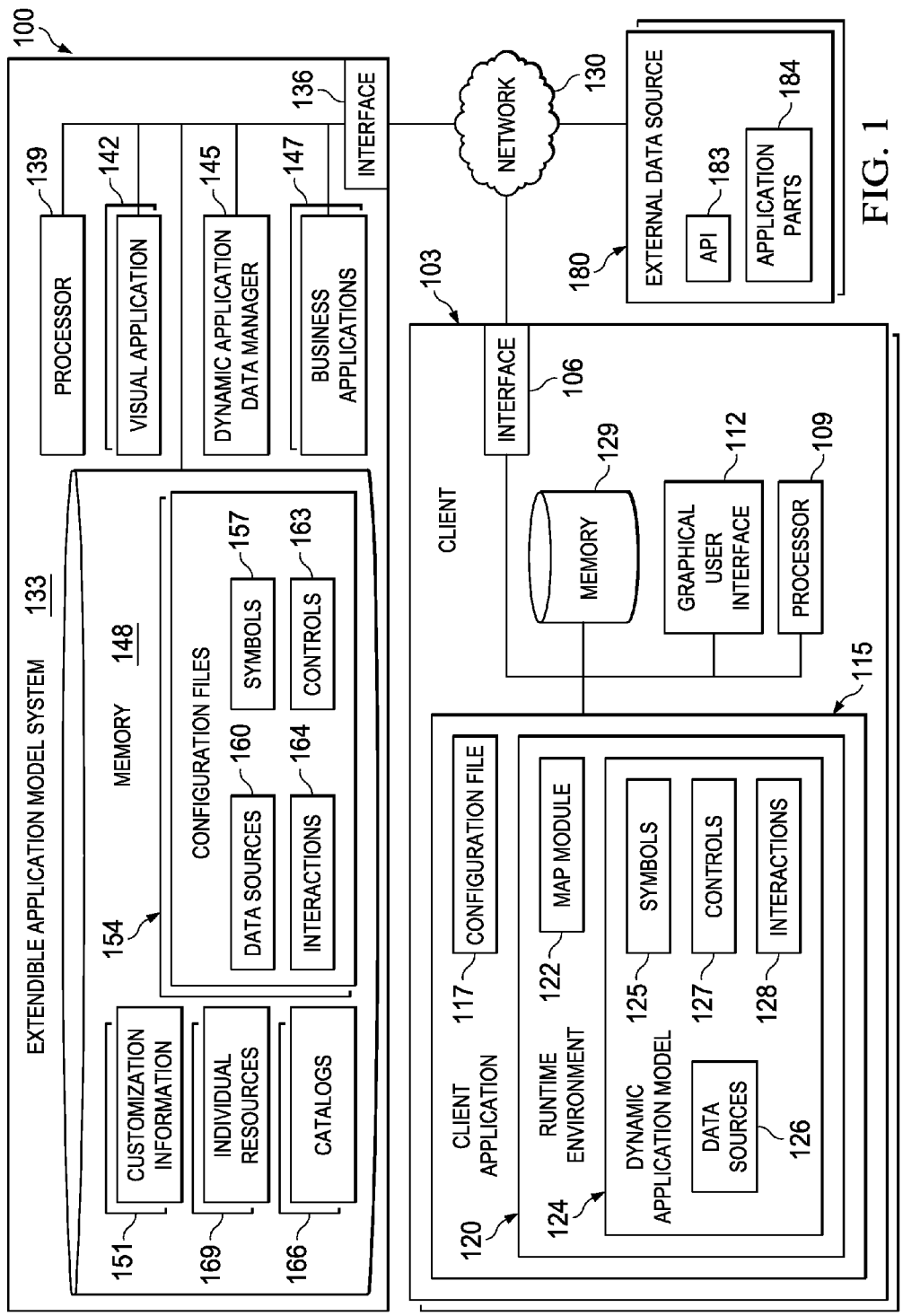
FIG. 1 illustrates an example of a computer system environment for using one or more application parts to enhance a map-based business application at runtime.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DETAILED DESCRIPTION

Map-based applications provide users with a visual-centric presentation of information. While map-based may be interpreted as visualizing a geographical map, alternative map-based applications may include inventory-related applications, space optimization applications (e.g., storage area or truck-packing applications), or interior structure visualizations (e.g., architectural-related applications, furniture and wiring illustrations, or other computer-aided design (CAD)-based applications), among others providing or presenting relative location information to users visually. When such applications are developed they are normally built to a common standard and, in some cases, a relatively generic, perspective to address the widest set of users. In some instances, particular end user use cases may be needed that are not providing in the original functionality of the underlying application, such that additional functionality may be desired. The present disclosure describes the use of application building blocks, or application parts, associated with one or more internal and/or external providers which can be added to a particular map-based application to provide additional information and functionality. The application building blocks' appearance, functionality, and association with a particular data source or application can be defined within a configuration file that stores the relevant configuration information, which is then incorporated or integrated into the map-based application at runtime using a runtime environment capable of parsing and applying the information in the configuration file to the runtime execution of the map-based application.

In one example, particular application parts associated with a customer relationship management (CRM) or supply chain management (SCM) system can be added to a transportation management (TM) system, such that information relating to particular customer locations can be easily added to the map-based application. Further, adding particular application parts to the map-based application may be performed in an intuitive manner in a visual user interface (UI), allowing complex additions to be made by non-technical employees. In some instances, information from both internal (e.g., CRM information) and external data sources (e.g., weather and traffic information) may both be used to enhance the map-based application, providing extensive customization to applications previously difficult to modify or enhance. In some instances, various zoom levels of the map-based business application may be associated with different application parts, such that varying levels of functionality are provided based on the current view of the map in the map-based application. When one or more application parts are selected within the map-based application, particular interactions and other functionality may be executed, including functionality associated with the internal and/or external data sources associated with the particular application parts. For example, if a CRM-related application part is selected or otherwise triggered, CRM-related information may be launched in a separate location (e.g., a new window, tab, or overlaid on the map-based application), or additional information may be retrieved to perform further actions or provide more detailed or related information to the user. Restated, the present solution allows standard or out-of-the-box applications to be enhanced without development of new data sources from the developer, while also providing full access to and interactions with the backend and third-party data.

FIG. 1 illustrates an example of a computer system environment 100 for using one or more application parts to enhance a map-based business application at runtime. Specifically, the illustrated environment 100 includes or is communicably coupled with one or more clients 103, an extendible application model system 133, and a network 130. In some instances, one or more external data sources 180 may also be communicably coupled with these components.

In general, the extendible application model system 133 is a server that stores one or more visual applications 142, where at least a portion of the visual applications 142 are executed via requests and responses sent to users or clients within and communicably coupled to the illustrated environment 100 of FIG. 1. In some implementations, the extendible application model system 133 may store a plurality of various visual applications 142, as well as other types of applications. In other implementations, the extendible application model system 133 may be a dedicated server meant to store and execute only a single visual application 142. In some implementations, the extendible application model system 133 may comprise a Web server, where the visual applications 142 represent one or more Web-based applications accessed and executed by the client 103 via the network 130 or directly at the extendible application model system 133 to perform the programmed tasks or operations of the visual application 142.

At a high level, the extendible application model system 133 comprises an electronic computing device operable to receive, transmit, process, store, or manage data and information associated with the environment 100. Specifically, the extendible application model system 133 illustrated in FIG. 1 is responsible for receiving application requests, for example, requests for one or more visual application-related actions, from one or more client applications 115 associated with the client 103 of the environment 100 and responding to the received requests by processing said requests in the associated visual application 142, and sending the appropriate response from the visual application 142 back to the requesting client application 115. In addition to requests from the client 103, requests associated with the visual application 142 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single extendible application model system 133, environment 100 can be implemented using two or more such servers 133, as well as computers other than servers, including a server pool. Indeed, extendible application model system 133 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated extendible application model system 133 may be adapted to execute any operating system, including Linux, UNIX, Windows, Mac OS®, Java™, Android™, iOS or any other suitable operating system. According to one implementation, extendible application model system 133 may also include or be communicably coupled with an e-mail server, a Web server, a caching server, a streaming data server, and/or other suitable server or computer.

In the present illustration, the extendible application model system 133 hosts and/or supports the visual application 142, and allows for users to enhance or otherwise modify the runtime execution of the visual application 142 on client 103. Specifically, the extendible application model system 133 provides a dynamic application data manager 145 that allows various configuration files 154 to be defined and modified. The configuration file 154 contain information defining how particular application parts are to be presented in a particular visual application 142, as well as how those application parts act and/or react when incorporated into a runtime instantiation of the visual application 142 on the client 103. The configuration file 154 is described in further detail below.

The extendible application model system 133 includes an interface 136, a processor 139, and a memory 148. The interface 136 is used by the extendible application model system 133 for communicating with other systems in a distributed environment—including within the environment 100—connected to the network 130; for example, the client 103, as well as other systems communicably coupled to the network 130 (not illustrated). Generally, the interface 136 comprises logic encoded in software and/or hardware in a suitable combination and operable to communicate with the network 130. More specifically, the interface 136 may comprise software supporting one or more communication protocols associated with communications such that the network 130 or interface's hardware is operable to communicate physical signals within and outside of the illustrated environment 100.

As illustrated in FIG. 1, the extendible application model system 133 includes a processor 139. Although illustrated as a single processor 139 in FIG. 1, two or more processors may be used according to particular needs, desires, or particular implementations of the environment 100. Each processor 139 may be a central processing unit (CPU), a blade, an application specific integrated circuit (ASIC), a field-programmable gate array (FPGA), or another suitable component. Generally, the processor 139 executes instructions and manipulates data to perform the operations of the extendible application model system 133. Specifically, the processor 139 executes the functionality required to receive and respond to requests from the client 103, as well as to update and provide one or more configuration files 154 in response to user interactions.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, JavaScript, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The extendible application model system 133 also includes a memory 148, or multiple memories 148. The memory 148 may include any type of memory or database module and may take the form of volatile and/or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the extendible application model system 133. Additionally, the memory 148 may include any other appropriate data, such as VPN applications, firmware logs and policies, firewall policies, a security or access log, print or other reporting files, as well as others.

As illustrated in FIG. 1, memory 148 includes or references data and information associated with and/or related to various configuration files 154, customization information 151, catalogs 166 including listings and information regarding available or created application parts, and individual resources 169 available for incorporation into the visual applications 142 when executed at the client 103. Additional data and information related to the extendible application model system 133 may also be included within memory 148. In one example, the customization information 151 can provide information defining one or more customized preferences associated with an individual user, a group of users, users in a particular role or location, or any other set of users or systems. Specific to the present disclosure, the customization information 151 can define one or more configuration files 154 to be provided in combination with particular instances of the visual application 142 when executed at client 103. For example, a user or administrator may define one or more application parts to be used with a particular visual application 142, such that when a user at the client 103 executes the visual application 142 using client application 115, the relevant configuration file 154 containing those application parts is provided to the client 103 and incorporated into the executing instance of the visual application 142 at runtime. In some instances, two or more configuration files 154 may be used in a single executing instance of the visual application 142, such that multiple sets of application parts are used during execution. Additionally, each configuration file 154 may be used by a plurality of users at a plurality of clients 103 simultaneously in some instances, such that two different users executing two different instances of the visual application 142 are provided with similar enhancements.

As illustrated, each configuration file 154 includes one or more symbols 157, data sources 160, controls 163, and interactions 164, where these components define how the enhancements associated with the configuration file 154 are applied and executed. Symbols 157 define the visualization and how a particular enhancement will look, while the data source 160 defines where information associated with a particular application part is located, as well as how the information can be accessed. The controls 163 define how the application part is to perform when included within the visual application 142. The interactions 164 define how the individual representations associated with a particular application part will react when the user viewing the representations interacts with them. For instance, if the visual application 142 provides a view of roads or other transportation information, and the application part added in a particular configuration file 154 is traffic information, the corresponding symbols may include various colored lines that are presented as overlaid on roads within the visual application 142. The data sources 160 for such information may be any traffic source, either provided by the same developer as the visual application 142, or by an external provider (e.g., from an external data source 180). The controls 163 may define that traffic information is only presented when the visual application's view is zoomed to a particular frame (e.g., such that individual roads or highways are visible). Additionally, the controls 163 may define a particular interval of time within which to check for updated information. In the case of traffic information, updated information may be requested on a regular and periodic basis to provide current traffic information at all times. Further, the interactions 164 may define that when a particular traffic representation is selected, that additional traffic information is retrieved from the associated data source, and a summary is presented in a pop-up or overlay box for further information. Other examples of application parts may include weather information, customer or supply chain information, or any other suitable information from an available data source. Configuration files 154 may be represented in any suitable format, including Extensible Markup Language (XML), JavaScript Object Notation (JSON), binary format, as well as others.

Configuration files 154 may be defined via an appropriate UI. The configuration files 154 may be defined manually using a development editor, as well as by using a WYSIWYG editor. Additionally at design time, one or more configuration files 154 (i.e., one or more application parts) can be added to an existing visual application 142. This can be performed by an administrator or end user to enhance the visual application 142. In one example, such enhancements can be defined using the power user UI described in FIGS. 5 and 6. At runtime, the system 133 can incorporate the configuration files 154 and their respective application parts into the runtime execution of the visual application 142 and provide the enhanced application 142 to the end user. In some instances, the dynamic application data manager 145 and/or visual application 142 may be associated with one or more UIs allowing users and/or administrators to design particular enhancements into the visual application 142. In some instances, the enhancements may be made during design time, when then visual application 142 is not in active use. Alternatively, the enhancements may be made during runtime of a particular instance of the visual application 142, such that the enhancements are added on-the-fly. When enhancements are made, whether in design time or at runtime, they can be saved to the corresponding configuration file 154 for use going forward. The user and/or administrator performing the enhancement can, in some instances, identify a particular end user or group of end users who may be associated with the configuration file 154, such that any instances of the visual application 142 run by those end users will apply the configuration file 154. Such associations can be stored in the customization information 151 for future use.

Memory 148 further includes a set of catalogs 166 representing a collection of available and previously defined application parts. The catalogs 166 may be presented to users and/or administrators for each selection of previously-defined application parts that can be used to enhance the visual application 142. The application parts provided in the catalogs 166 may be associated with both internal and external (or 3$^{rd}$-party) application parts available to the user and/or administrator. Each of the application parts may include default settings for their corresponding symbols, data sources, controls, and interactions. At least some of these application parts can be modified and customized by the user and/or administrator performing the enhancement, such that one or more of the values can be changed to suit the particular use case. In some instances, the user and/or administrator may add or identify one or more individual resources 169 that are not associated with a particular catalog 166. In some instances, these individual resources 169 may be defined from scratch using the appropriate UI and tools, or they may be resources 169 that are simply not yet associated with a catalog 166. Individual resources 169 may be added to one or more of the catalogs 166 at any suitable time.

The dynamic application data manager 145, as described, provides multiple functions in the present system. In some instances, multiple components may perform the functionality described herein. In one instance, the dynamic application data manager 145 can determine, based on the particular user executing the visual application 142, as well as based on the customization information 151, which configuration files 154 should be provided to the client 103. The dynamic application data manager 145 can perform the operations for actually providing the configuration files 154 to the client 103. Further, the dynamic application data manager 145 can be used in conjunction with the visual application 142 to provide the listing of catalogs 166 to users and/or administrators via the appropriate UIs, as well as to create and/or update the configuration files 154 in response to user selections and directions. The dynamic application data manager 145 may allow users and/or administrators to modify the existing application parts, as well as to define new application parts, where appropriate.

The extendible application model system 133 also includes one or more business applications 147. The business applications 147 may represent additional applications executing internal to or external from the extendible application model system 133, and from which backend data can be associated with particular application parts. For instance, one business application 147 may be an ERP or CRM application, from which up-to-date data can be linked with particular application parts. When the application part is being incorporated into the runtime instance of the visual application 142, the business applications 147 associated with the application part may be accessed or queried to provide current information to the visual application 142 and the runtime environment 120, such that the instance of the visual application 142 is using accurate data. In some instances, the runtime environment 120 may request, retrieve, or receive information on a periodic basis, as well as in response to particular events or triggers.

Network 130 facilitates wireless or wireline communications between the components of the environment 100 (i.e., between the extendible application model system 133, the one or more external data sources 180, and one or more clients 103), as well as with any other local or remote computer, such as additional clients, servers, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the components associated with the extendible application model system 133 and the one or more external data sources 180 included within network 130 as one or more cloud-based services or operations. For example, one or more of the external data sources 180 and/or at least a portion of the extendible application model system 133 may be within the network 130, and operated at least partially within a cloud-based system. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

The one or more external data sources 180 may be associated with the data sources 160 as identified in the configuration file 154, such that information associated with particular application parts may be accessed through appropriate requests to the external data sources 180 at runtime, such as through an appropriate application programming interface (API) 183. In other instances, data sources 160 (and data sources 126) may be one or more backend applications associated with the extendible application model system 133, or any other suitable backend system, such as a CRM or ERP system, among others, where real-time and/or updated data can be retrieved, associated with, and/or used to identify the appropriate location, visualization, and/or data associated with the application parts incorporated into the visual application 142. Additionally, some external data sources 180 may include their own set of application parts 184, similar to those provides within catalogs 166. These application parts 184 may be available to incorporate within the visual application 142 for enhancement. These application parts 184 may be associated with particular remote data sources, while in other instances, the data sources may actually be within the same system as the extendible application model system 133. In some instances, one or more of the application parts 184 may be listed in one or more of the catalogs 166 at the extendible application model system 133.

The illustrated environment of FIG. 1 also includes the client 103, or multiple clients 103. The client 103 may be any computing device operable to connect to or communicate with at least the extendible application model system 133 via the network 130 using a wireline or wireless connection. In general, the client 103 comprises an electronic computer device operable to receive, transmit, process, and store any appropriate data associated with the environment 100 of FIG. 1.

The illustrated client 103 includes an interface 106, a processor 109, and a memory 129. The interface 106 is used by the client 103 for communicating with other systems in a distributed environment—including within the environment 100—connected to the network 130; for example, the extendible application model system 133, as well as other systems communicably coupled to the network 130 (not illustrated). Generally, the interface 106 comprises logic encoded in software and/or hardware in a suitable combination and operable to communicate with the network 130. More specifically, the interface 106 may comprise software supporting one or more communication protocols associated with communications such that the network 130 or interface's hardware is operable to communicate physical signals within and outside of the illustrated environment 100.

As illustrated in FIG. 1, the client 103 includes a processor 109. Although illustrated as a single processor 109 in FIG. 1, two or more processors may be used according to particular needs, desires, or particular implementations of the environment 100. Each processor 109 may be a central processing unit (CPU), an application specific integrated circuit (ASIC), a field-programmable gate array (FPGA), or another suitable component. Generally, the processor 109 executes instructions and manipulates data to perform the operations of the client 103. Specifically, the processor 109 executes the functionality required to send requests to the extendible application model system 133 and to receive and process responses from the extendible application model system 133, as well as to execute the client application 115 and its associated functionality.

Further, the illustrated client 103 includes a graphical user interface (GUI) 112. The GUI 112 interfaces with at least a portion of the environment 100 for any suitable purpose, including generating a visual representation of a Web browser, which can in turn present information associated with the client application 115 executing an instance of the visual application 142. In particular, the GUI 112 may be used to view and navigate various Web pages located both internally and externally to the extendible application model system 133, including some or all of the visual application 142 and its related pages or functionality. The GUI 112 associated with each client 103 may comprise a graphical user interface operable to, for example, allow the user of a client 103 to interface with at least a portion of the visual application 142 and its associated operations and functionality, as well as other applications. Generally, the GUI 112 provides the particular user with an efficient and user-friendly presentation of business data provided by or communicated within the system. The GUI 112 may comprise a plurality of customizable frames or views having interactive fields, pull-down lists, and buttons operated by the user. For example, the GUI 112 may provide interactive elements that allow a user to interact with a particular visual application 142, as well as other components within and/or external to environment 100. The different portions of the extendible application model system's functionality may be presented and accessible to the user through the GUI 112, such as through the client application 115. Generally, the GUI 112 may also provide general interactive elements that allow a user to access and utilize various services and functions of a particular visual application 142. The GUI 112 may present information associated with the client application 115 for viewing and interaction. In general, the GUI 112 is often configurable, supports a combination of tables and graphs (bar, line, pie, status dials, etc.), and is able to build real-time portals, where tabs are delineated by key characteristics (e.g., site or micro-site). Therefore, the GUI 112 contemplates any suitable graphical user interface, such as a combination of a generic web browser, intelligent engine, and command line interface (CLI) that processes information in the platform and efficiently presents the results to the user visually.

The illustrated client 103 also includes a memory 129, or multiple memories 129. The memory 129 may include any memory or database module and may take the form of volatile or non-volatile memory including, without limitation, magnetic media, optical media, random access memory (RAM), read-only memory (ROM), removable media, or any other suitable local or remote memory component. The memory 129 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 103. Additionally, the memory 129 may include any other appropriate data, such as VPN applications, firmware logs and policies, firewall policies, a security or access log, print or other reporting files, as well as others. In some instances, memory 129 can store information associated with one or more configuration files 117 provided by the extendible application model system 133 (and its dynamic application data manager 145) for use in executing a particular instance of the visual application 142.

The illustrated client 103 further includes a client application 115. The client application 115 is any type of application that allows the client 103 to request and view content on the client 103. In some implementations, the client application 115 can be and/or include a Web browser. In some implementations, the client-application 115 can use parameters, metadata, and other information received at launch to access a particular set of data from the extendible application model system 133, and, in particular, the visual application 142. Once a particular client application 115 is launched, a user may interactively process a task, event, or other information associated with the extendible application model system 133, including one or more visual applications 142 and functionality associated with the dynamic application data manager 145. Further, although illustrated as a single client application 115, the client application 115 may be implemented as multiple client applications in the client 103. In some instances, the client application 115 may be an agent or client-side version of the one or more visual applications 142.

As illustrated, the client application 115 includes the configuration file 117 (described above) and a runtime environment 120. The configuration file 117 is provided to the client application 115 to allow the runtime environment 120 to execute the visual application 142 with the various enhancements defined in the configuration file 117. The runtime environment 120 may represent any suitable platform, including HTML5 or ActiveX, among others. The runtime environment 120 includes a map module 122 for presenting map-based visualizations associated with the visual application 142. The map module 122 may be a plug-in associated with the visual application 142, a generic module allowing maps or other location or organization-related visualizations to be presented, or any other suitable module. The map module 122 may be a remotely executed portion of the visual application 142, or a client-side agent of the visual application 142, in some instances. The map module 122 works with a dynamic application model 124, within the runtime environment 120, to incorporate the application parts identified in the configuration file 117 into the runtime instance of the executing visual application 142.

The dynamic application model 124 can identify the symbols 125, data sources 126, controls 127, and interactions 128 associated with the application parts used to enhance the instance, and can, in conjunction with the runtime environment 120, incorporate those portions of the application parts into the runtime instance of the visual application 142. The dynamic application model 124 generally corresponds with a particular one or more configuration files 154 received from the extendible application model system 133, where the particular one or more configuration files 154 are provided based on the user, the user's role, the user's location, the user's organization, and other customizable information included in the customization information 151.

There may be any number of clients 103 associated with, or external to, the environment 100. For example, while the illustrated environment 100 includes one client 103, alternative implementations of the environment 100 may include multiple clients 103 communicably coupled to the extendible application model system 133 and/or the network 130, or any other number suitable to the purposes of the environment 100. Additionally, there may also be one or more additional clients 103 external to the illustrated portion of environment 100 that are capable of interacting with the environment 100 via the network 130. Further, the term "client" and "user" and "administrator" may be used interchangeably as appropriate without departing from the scope of this disclosure. Moreover, while the client 103 is described in terms of being used by a single user, this disclosure contemplates that many users may use one computer, or that one user may use multiple computers.

The illustrated client 103 is intended to encompass any computing device such as a desktop computer, laptop/notebook computer, wireless data port, smart phone, personal data assistant (PDA), tablet computing device, one or more processors within these devices, or any other suitable processing device. For example, the client 103 may comprise a computer that includes an input device, such as a keypad, touch screen, or other device that can accept user information, and an output device that conveys information associated with the operation of the extendible application model system 133 or the client 103 itself, including digital data, visual information, or a GUI 112, as shown with respect to the client 103.

Figure 2:
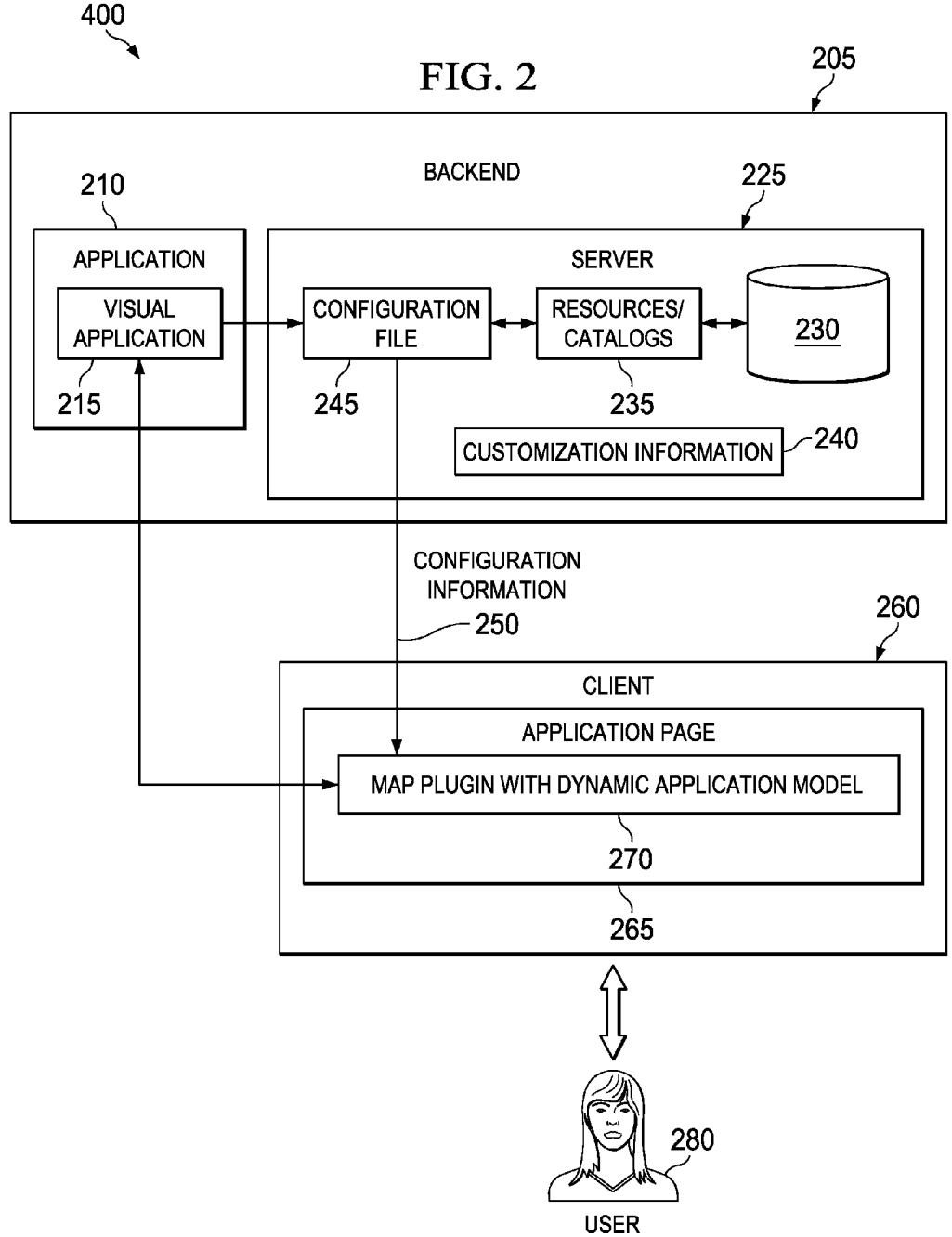
FIG. 2 illustrates a diagram of an alternative view of an example environment associated with a particular implementation of the disclosed subject matter.

FIG. 2 illustrates a diagram of an alternative view of an example environment associated with a particular implementation of the disclosed subject matter. Several of the elements in FIG. 2 may be similar to or different from those described in FIG. 1. FIG. 2 presents a backend system 205, a client 260, and a user 280. The backend system 205 is split into an application system 210 and a backend server 225. The application system 210 hosts and/or executes a visual application 215. The visual application 215 interacts with both the server 225 and the client 260. Specifically, the visual application 215 is served when the client 260, and its particular application page 265, requests a portion of the visual application 215 to execute. In response, the visual application 215 notifies the server 225 of the request to determine whether one or more configuration files 245 are to be used with the requested visual application 215 instance.

Server 225 provides information used in providing an enhanced visual application 215 instance to the user 280. The server 225 stores and manages one or more catalogs 235 of application part-related information, a plurality of configuration files 245, and a set of customization information 240. Some or all of this information may be managed locally within memory 230, while other portions may be stored and managed remotely from the server 225. In some instances, the server 225 may provide additional functionality allowing user 280, such as developers and administrators, to enhance a particular instance of the visual application 215 by identifying and/or defining one or more application parts to be added to the instance. In the current illustration, several configuration files 245 are already defined based on one or more resources and catalogs 235 defining one or more application parts to be used, as well as particular parameters associated with those application parts. Further, the customization information 240 allows the server 225 and visual application 215 to determine which configuration files 245 apply to the particular user 280 associated with the application page's request. In response to the request for a particular visual application 215, the server 225 provides the configuration information 250 associated with the configuration file(s) 245 appropriate for the user 280 to the application page 265. The configuration information 250 and the configuration files 245 may be represented in any suitable format, including XML, JSON, or binary format, among others.

The application page 265 is executed in an appropriate client runtime environment (similar to the runtime environment 120 of FIG. 1) capable of assisting in the incorporation of the application parts provided with the configuration information 250 into the current instance of the application page 265 associated with the visual application 215. The map plugin 270, which may be any suitable plugin or other software capable of presenting map-based visualizations, uses the configuration information 250 to instantiate the instance of the visual application 215 executing at the application page 265. In some instances, the instance may be updated after the instance has already been executing, while in other instances, the initial instantiation of the instance will apply the enhancements defined by the configuration information 250. Once the enhancements are incorporated into the instance of the visual application 215, the user 280 may view the enhancements and relevant application parts as an integrated portion of the visual application 215. In some instances, the visual application 215 may be defined itself by a particular configuration file. At runtime, the configuration file associated with the visual application 215 may be executed, at the client 260 within map plugin 270, by integrating the information from the configuration file 245 defining one or more application parts to be added to the running instance of visual application 215. Interactions with the application parts can result in the particular interactions associated with the corresponding application part. For example, if the application parts added relate to a CRM application's information on customer's location within the map presented by the visual application 215, then interacting with a symbol associated with the application part can retrieve additional information from the CRM system and present that information to the user 280. In some instances, the presentation may be done within the visual application 215 instance, while in others a separate CRM-related application or application page may launch to provide the additional information related to the interaction.

Figure 3:
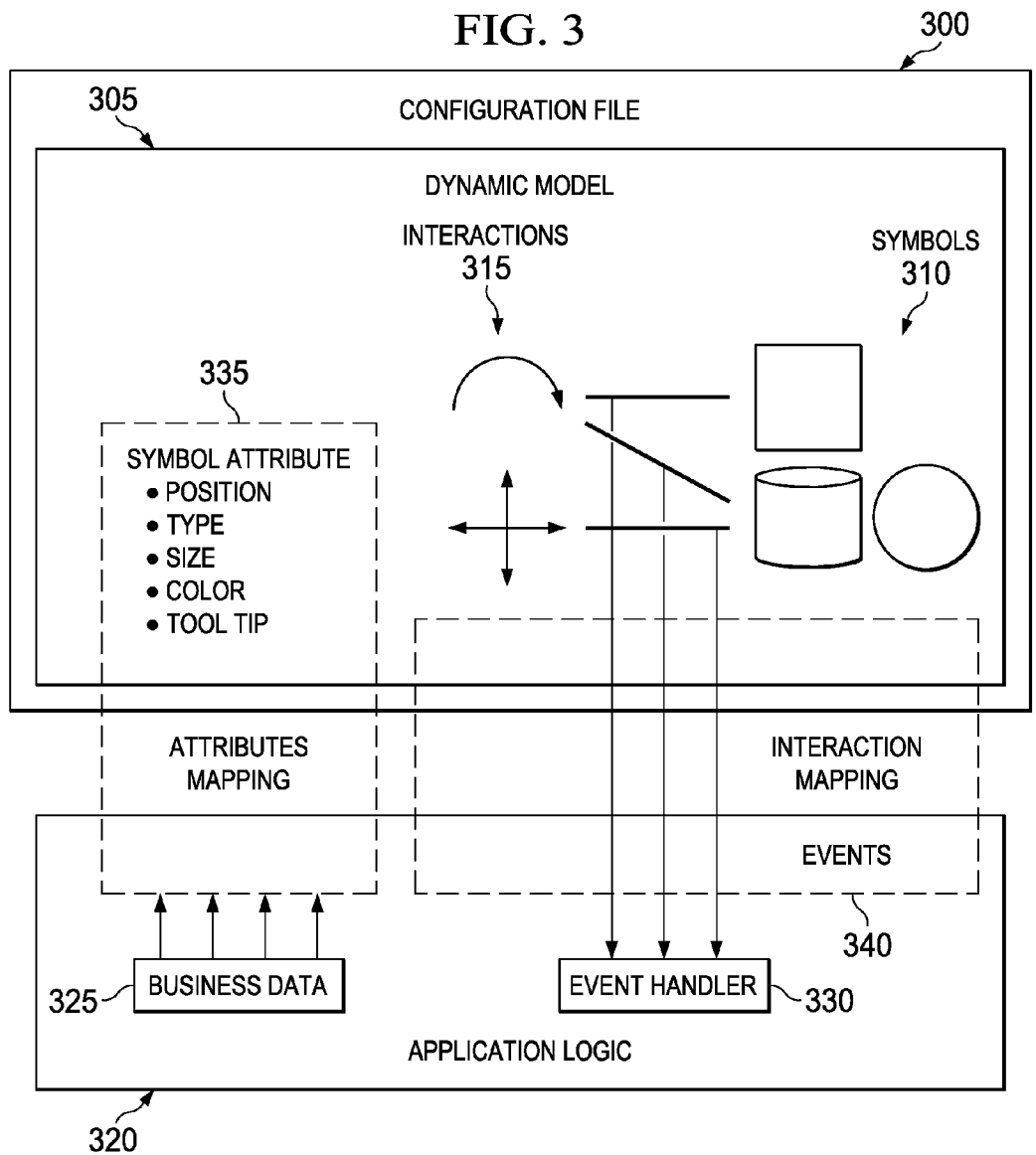
FIG. 3 illustrates an example view of a configuration file defining one or more enhancements to and application parts for a map-based business application in a particular implementation of the disclosed subject matter.

FIG. 3 illustrates an example view of a configuration file 300 defining one or more enhancements to and application parts for a map-based business application, and application logic 320 associated with the defined portions of the configuration file 300. As illustrated, the configuration file 300 includes definitions of how the application parts to be added to the application will be presented (i.e., dynamic model 305, including symbols 310, symbol attributes 335, and interactions 315). In some instances, certain application parts may be associated with a default symbol or set of symbol attributes. When adding the application part to a particular application via a configuration file 300, users may be able to modify the symbol and symbol attributes to provide a customized visual appearance. Similarly, other aspects of a particular application part may be modified by users with sufficient authority and/or access to do so. The interactions 315 defined by the application part may identify the types of interactions that can be performed when the particular application part is presented in the application.

The application logic 320 comprises a portion of a backend or third-party application or data source associated with at least one of the application parts defined in the configuration file 300. Specific business data 325 can be associated with the application part. For example, the application part may correspond to information on delivery trucks on the road for the user's company. The business data 325 (provided by the application logic 320 in a backend application) associated with the configuration file 300 can be the current location of those delivery trucks, and the default symbol (as defined in the configuration file 300) for the trucks may be an image of a truck, although users may be able to modify the symbol, as well as its size, color, and other symbol attributes. Each truck at a location within the boundaries of the current map may be presented as an individual truck symbol based on retrieved business data 325 defining the coordinates of each truck. In response to various interactions with the presented trucks, one or more events 340 may be defined in the configuration file 300 such that an event handler 330 in the application logic 320 of the backend application can execute those events 340 in response to the interaction, and provide information associated with the response back to the application using the configuration file 300. For example, in response to double-clicking on a particular truck symbol, information on that delivery truck's particular load, destination, and expected arrival may be provided from the backend application via the event handler 330 and events 340 performed by the backend application. These, as well as any other suitable attributes, may be defined within the configuration file 300 and used to enhance the application at runtime, without modifying the underlying application itself for other users. In some instances, one or more of the attributes may be based upon the values or type of business data 325 identified. For example, statistics, for example, sales volume, may be used to determine the appropriate size, color, shape, or other attribute of a symbol. In another example, delivery trucks who have completed a delivery may be green, while delivery trucks who are behind in their schedule may be red and bolded. Additional business data-based attributes may be defined.

Figure 4A:
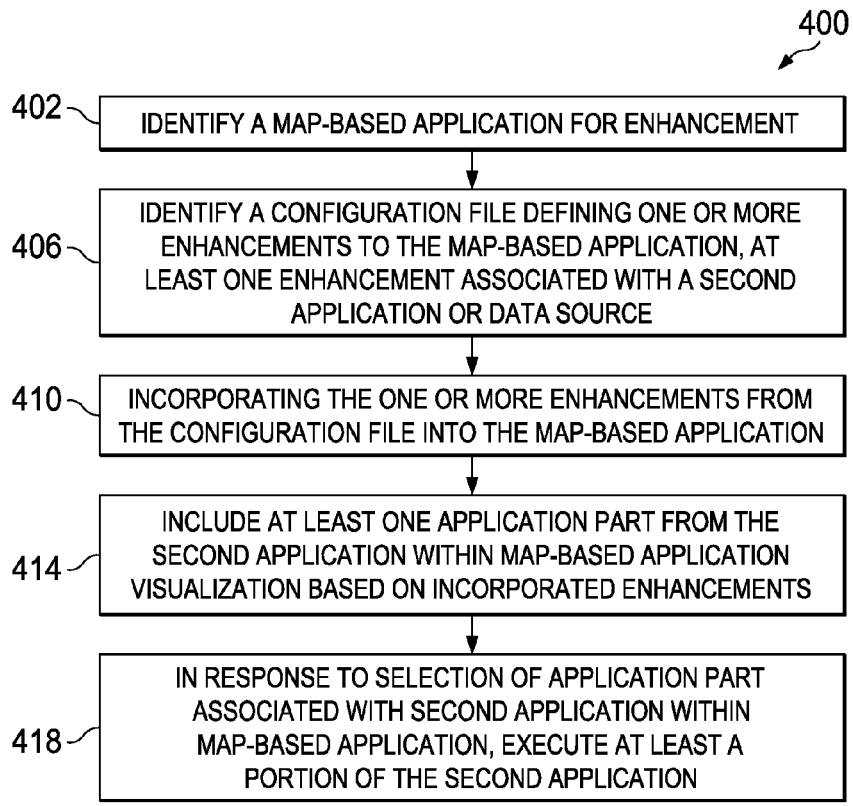
FIGS. 4A and 4B illustrate example methods for applying enhancements in a configuration file to a particular map-based application.
Figure 4B:
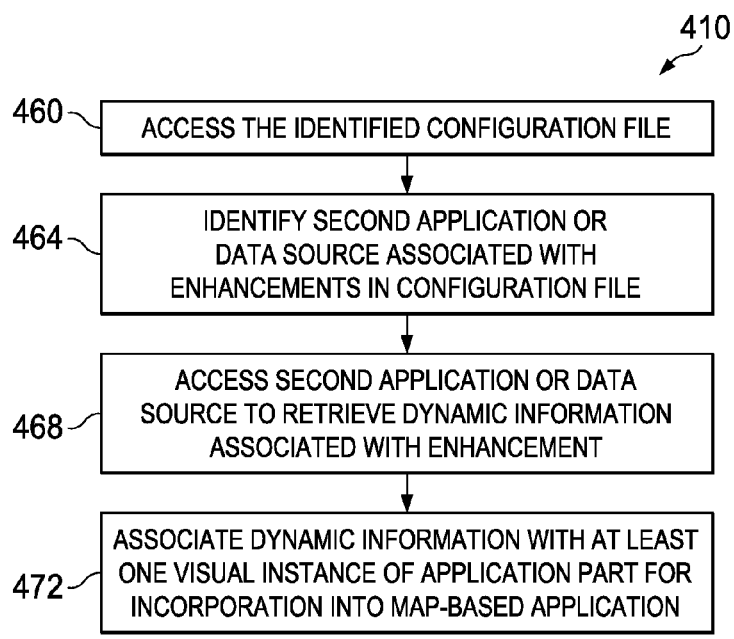
Figure 4C:
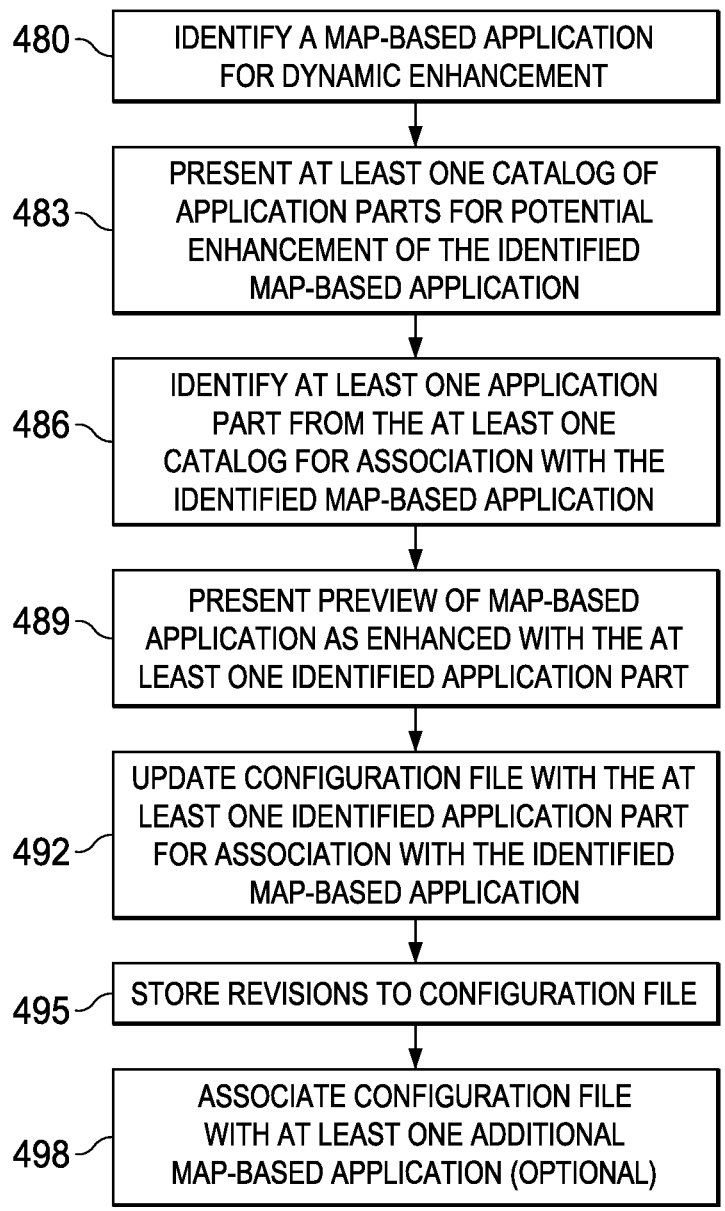
FIG. 4C illustrates an example method for defining one or more enhancements in a configuration file at design time.

FIGS. 4A, 4B, and 4C illustrate several example methods used with the present disclosure. First, FIG. 4A illustrates an example method 400 for applying enhancements defined within a configuration file to be applied to a particular visual, or map-based, application. For clarity of presentation, the description that follows generally describes method 400 in the context of FIG. 1. However, it will be understood that method 400 may be performed, for example, by any other suitable system, environment, software, and hardware, or a combination of systems, environments, software, and hardware, as appropriate. For example, one or more of the extendible application model system, the client, or other computing device (not illustrated) can be used to execute method 400.

At 402, an instance of a map-based application is identified for dynamic enhancement. The map-based application may provide a two-dimensional or a three-dimensional representation of a map. In some instances, the map-based application may be toggled between the two dimensions. In other instances, the map-based application may provide one-dimensional, as well as four- or more dimensional maps. In some instances, the operation at 402 may be made in response to a request to instantiate a new instance of the map-based application at a remote location, such as at a remote client. In other instances, the map-based application may be identified after the instance of the map-based application has been running, allowing for the application to be updated on the fly. In those instances, a user may access an enhancement panel or toolbar to define one or more application parts to be used in enhancing the application.

At 406, a configuration file defining one or more dynamic enhancements to be added to the map-based application is identified. The configuration file can define one or more enhancements (i.e., application parts) associated with a second application or data source to be added to the map-based application. In some instances, the second application may be a backend application related to the map-based application. For example, the map-based application may be a transport management system providing information on deliveries throughout a particular region. Relevant information from the second, backend application may include customer location, sales information, and supply chain information, among others. Alternatively, the data source may be linked to an external data source, as well as an internal data source. Examples of external data may include weather data and/or traffic data in the prior transportation management example.

In some instances, two or more configuration files may be identified for, and later applied to, a single instance of the map-based application. Identifying the configuration file may be based on a manual selection by a user, either prior to instantiation or during runtime, of a particular set of application parts to apply to the map-based application. Alternatively, the particular configuration file or files identified may be based on personal or institutional preferences, as well as a customization file. Administrators can define one or more enhancements to be added to the map-based application, and can then identify certain users or groups of users to use those enhancements by associating the configuration file or files with those users in the customization file. For example, the associations may be user-specific, role-specific, location-specific, group-specific, job-specific, or any other suitable type. Alternatively, individual users can define particular enhancements for the map-based application, and can save those enhancements in a configuration file. That configuration file can then be associated specifically with the user in the customization file. When a customization file identifies a set of particular enhancements for the user, then the map-based application may be enhanced upon instantiation, in some cases. The configuration file may provide additional content and enhancements to the map-based application in some instances. In others, the configuration file may define one or more deviations from a default operation, including alternative and/or replacement operations and settings for the map-based application.

At 410, the one or more enhancements identified from the configuration file are incorporated into the map-based application. In some instances, the enhancements may be applied at the instantiation of the current map-based application instance, while in others, the enhancements may be applied while the map-based application is running. A running map-based application instance may restart when enhancements are applied during runtime, such that the new application instance applies the enhancements at instantiation. In other instances, when the enhancements are added at runtime, the enhancements may be made within the same, previously executing instance. A suitable component may perform the enhancement, such as the runtime environment 120 described in FIG. 1.

At 414, at least one application part from the second application or data source is included within the map-based application based on the incorporated enhancements. Once added, the application part may be represented by a plurality of symbols or other visualizations associated with the business data related to the application part. For example, if customer location information is added to the map-based application, then a plurality of symbols associated with multiple customer locations can be presented in the map-based application to represent each location within the particular boundaries of the map. As noted, configuration files may be associated with a single application part or a plurality of application parts, while multiple configuration files may be associated with a single instance of the map-based application.

At 418, and in response to a user's selection of or interaction with a particular application part (or application part instance) within the map-based application, a corresponding event or action associated with the application part is executed. In some instances, that may include executing a portion of the second application or executing an operation based on the data associated with the particular application part. The application part instances may be associated with and/or defined by, as described above, particular events and backend applications. For example, when a particular application part instance is selected, additional information may be obtained from the associated data source and/or second application. In other instances, the second application may launch to provide information related to the particular application part in response to the interaction. Other suitable events and operations may be performed in response to the interaction.

FIG. 4B represents an example sub-process associated with operation 410 of FIG. 4A, specifically, one example of how the one or more enhancements are incorporated into the map-based application from the configuration file. FIG. 4B is meant to illustrate one example of incorporation, and is not meant to be exhaustive or limiting.

At 460, the identified configuration file defining the one or more application parts is accessed. This operation may be performed at instantiation or during runtime, depending on when the configuration file is applied to the map-based application. At 464, the second application or data source associated with the enhancements or application parts is identified within the configuration file. At 468, the second application or data source is accessed to retrieve dynamic business data or other relevant information to be associated with particular instances of the application part. At 472, that dynamic information is then associated with the visual representation of the corresponding application part (i.e., a symbol defined within the configuration file representing a particular instance of the application part).

FIG. 4C illustrates an example method 475 for defining one or more enhancements to be associated with a map-based application. These operation can be performed at design time by a user or administrator, as well as during runtime when one or more application parts are added to enhance a running application. For clarity of presentation, the description that follows generally describes method 475 in the context of FIG. 1. However, it will be understood that method 475 may be performed, for example, by any other suitable system, environment, software, and hardware, or a combination of systems, environments, software, and hardware, as appropriate.

At 480, a map-based application to be provided at least one dynamic enhancement is identified. As described above, this operation could be performed at runtime or at design time. At 483, at least one catalog of application parts for potential enhancement of the identified map-based application is presented or made available. In some instances, the catalogs may identify application parts both internal to and external from the system or network associated with the map-based application, for instance, from a source within a particular business (i.e., internal) or from a source at a third-party provider (i.e, external). Internal application parts may include enhancements associated with one or more related applications, such as applications provided by the same developer or company as the map-based application. External application parts may be associated with third-party providers (e.g., traffic, weather, etc.). In some instances, the at least one catalog may be provided within a window overlaying or to the side within the map-based application, allowing the person adding the enhancement to drag-and-drop application parts onto the map of the map-based application.

At 486, at least one application part from the at least one catalog may be identified as an enhancement to the map-based application. For instance, the at least one application part can be dragged onto the map of the map-based application, or the at least one application part can be otherwise selected for addition to the map-based application. In some instances, a generic application part may be selected for addition, where the generic application part allows the user enhancing the application to manually define a plurality of parameters associated with the application part, including one or more of the symbol, interaction, data source, controls, and event triggers associated with the application part instances. Alternatively, one or more of the parameters associated with a particular, non-generic application part may be modified or otherwise customized when being added to the map-based application, as well as at any other suitable time.

At 489, a preview of the map-based application as modified by the at least one enhancement/application part may be presented, in some instances. For example, data associated with the at least one application part can be retrieved, and corresponding application parts may be presented upon the map. This may provide users the opportunity to customize or reject the at least one application part prior to finalizing their addition to the map-based application and corresponding configuration file.

At 492, a configuration file storing information defining one or more enhancements to the map-based application is updated. The configuration file may be a standalone file on its own, or it may be a series of entries within a database table. The configuration file can be automatically stored when one or more application parts are added at 486, or when those additions are finalized. Alternatively, the configuration file can be manually updated by the user manually confirming the enhancements. At 495, the configuration file can be stored for future use, while also being applied to the current runtime instance in appropriate situations. At 498, the configuration file can be associated with at least one additional map-based application, allowing for similar application parts to be added to other map-based applications. Additionally, the configuration file stored at 495 can be associated with a plurality of users and groups of users, such that a set of similar users can, where appropriate, have the same set of enhancements applied to the map-based application.

Figure 5:
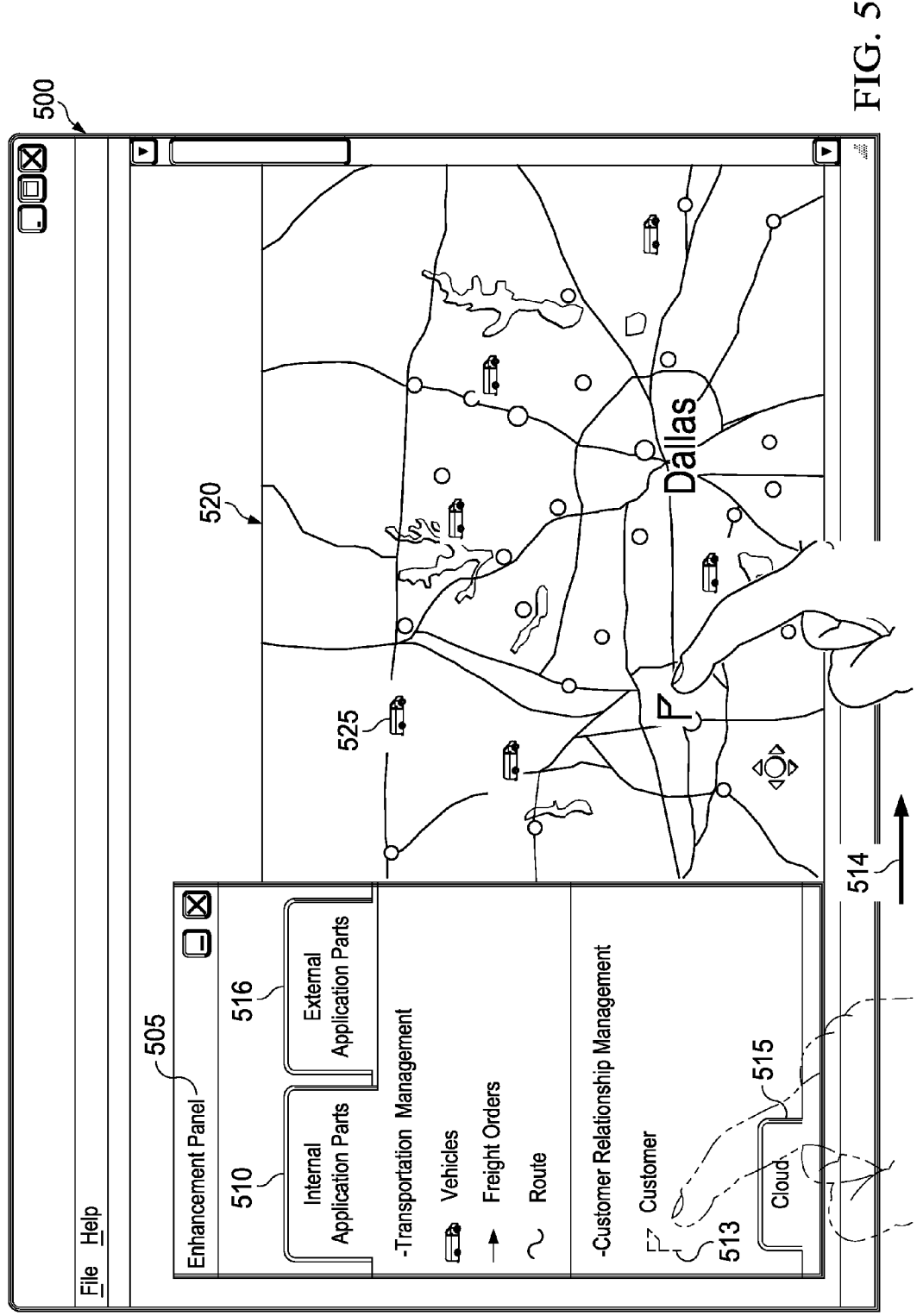
FIGS. 5 and 6 illustrate example screenshots of a pre- and post-enhancement map-based business applications, respectively.

FIG. 5 illustrates an example map-based application prior to the addition of one of one or more application parts. The map-based application (500) is presented in its own window, and includes map 520. In the illustrated example, the map-based application 500 is a transportation management application, and presents information on the location of one or more vehicles 525. Menu 505 provides a listing of one or more possible application parts to possibly be added to the map-based application 500. In the example illustration, the internal application part options 510 include vehicles, freight orders, and routes. As illustrated in the map 520, the vehicles 525 are already provided within the map-based application 500, either as part of the underlying map-based application 500 or as previously added as an application part.

Figure 6:
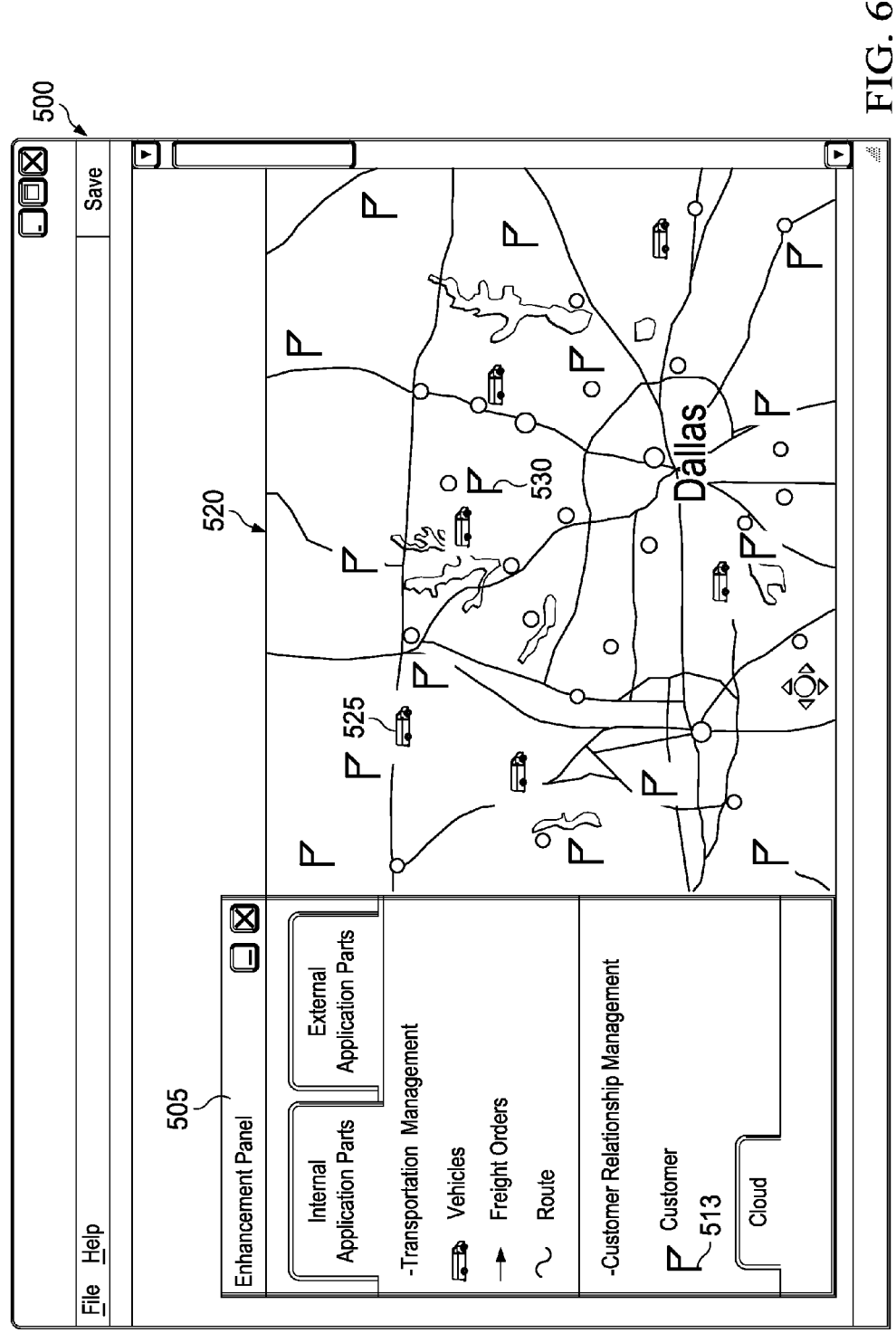

One application part provided in menu 505 includes a Customer application part 513, associated with a CRM application. As illustrated by gesture 514, the Customer application part 513 can be dragged onto the map. FIG. 6 shows the results of such an addition. Of note, menu 505 includes a section for Cloud-based application parts 515, as well as an external application part tab 516. In some instances, both may be included in a single catalog along with the internal application parts.

Turning to FIG. 6, the effect of the addition of the Customer application part 513 in FIG. 5 is shown. In particular, multiple application part instances 530 related to the Customer application part 513 are provided in each location where a Customer is located on the map 520. Multiple different application parts can be added to the map-based application, such that the application is enhanced in multiple ways. This is a simple example, and more complex examples are understood to be within the boundaries of the present disclosure. Further, the various Customer application part instances 530 may be interacted with (e.g., by clicking on the flag symbol) to cause an event to occur as defined in the configuration file. For example, interacting with a particular Customer application part instance 530 may cause the CRM application to launch a window associated with the particular application part instance 530 to provide information relating to the particular customer associated with the application part instance.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method executed by one or more processors, the method comprising:
   identifying a map-based application for enhancement;
   identifying a configuration file defining one or more application parts for enhancing the map-based application, the one or more application parts associated with a second application, the second application comprising a transportation management system monitoring real-time locations of a plurality of vehicles; and
   incorporating the one or more application parts from the identified configuration file into the map-based application, wherein incorporating the one or more application parts into the map-based application comprises:
   identifying a symbol associated with each of the one or more application parts;
   accessing, from the second application, dynamic business data that is associated with each of the one or more application parts, wherein the dynamic business data includes a current location of each of the plurality of vehicles; and
   inserting an instance of the symbol for each application part based on the accessed dynamic business data from the second application, each instance of the symbol representing a particular vehicle and its current location defined in the second application, wherein inserting the instance of the symbol for each application part includes associating at least one event associated with the second application with each inserted symbol, wherein interaction by a user with the instance of the symbol triggers the at least one event associated with the second application, the at least one event comprising accessing and presenting additional detailed information from the dynamic business data associated with the particular vehicle represented by the instance of the symbol interacted with by the user in the map-based application, wherein the configuration file defines the at least one event and types of interactions associated with each application part, and wherein an event handler in the second application executes the at least one event in response to the interaction by the user and provides the additional detailed information using the configuration file.

2. The method of claim 1, wherein inserting the instance of the symbol for each application part based on the accessed dynamic business data from the second application comprises inserting a plurality of symbols into the map-based application for at least one of the application parts, the plurality of symbols associated with a plurality of instances of the application part as determined based on the accessed dynamic business data.

3. The method of claim 1, wherein identifying the configuration file for enhancing the map-based application is based on a pre-defined association with a user of the map-based application.

4. The method of claim 3, wherein the pre-defined association with the user of the map-based application is based on at least one of the user's role, location, or job.

5. The method of claim 1, further comprising, in response to identifying interaction by the user with the symbol, executing at least a portion of the second application.

6. The method of claim 1, wherein the second application is at least one of a customer relationship management or a supply chain management application associated with the map-based application.

7. The method of claim 1, wherein the second application is associated with a third-party provider, separate from the map-based application.

8. The method of claim 1, wherein incorporating the one or more application parts from the identified configuration file into the map-based application is performed upon instantiation of an instance of the map-based application.

9. The method of claim 1, wherein incorporating the one or more application parts from the identified configuration file into the map-based application is performed during runtime of an instance of the map-based application after prior instantiation of the instance.

10. The method of claim 1, wherein identifying the configuration file for enhancing the map-based application comprises identifying two or more configuration files, and wherein incorporating the one or more application parts from the identified configuration file into the map-based application comprises incorporating the one or more application parts from each of the identified two or more configuration files into the map-based application.

11. The method of claim 1, wherein the dynamic business data further includes information defining each vehicle's load, destination, and expected arrival time, the method further comprising:
in response to a user interaction with a particular instance of a symbol representing a particular vehicle, providing at least one of the particular vehicle's load, destination, and expected arrival time from the second application.

12. The method of claim 1, wherein the dynamic business data includes information defining each vehicle's delivery status, wherein the symbol for each of the plurality of vehicles indicates each vehicle's delivery status.

13. A system, comprising:
a processor;
a computer-readable storage medium coupled to the processor having instructions stored thereon which, when executed by the processor, cause the processor to perform operations comprising:
identifying a map-based application for enhancement;
identifying a configuration file defining one or more application parts for enhancing the map-based application, the one or more application parts associated with a second application, the second application comprising a transportation management system monitoring real-time locations of a plurality of vehicles; and
incorporating the one or more application parts from the identified configuration file into the map-based application, wherein incorporating the one or more application parts into the map-based application comprises:
identifying a symbol associated with each of the one or more application parts;
accessing, from the second application, dynamic business data that is associated with each of the one or more application parts, wherein the dynamic business data includes a current location of each of the plurality of vehicles; and
inserting an instance of the symbol for each application part based on the accessed dynamic business data from the second application, each instance of the symbol representing a particular vehicle and its current location defined in the second application, wherein inserting the instance of the symbol for each application part includes associating at least one event associated with the second application with each inserted symbol, wherein interaction by a user with the instance of the symbol triggers the at least one event associated with the second application, the at least one event comprising accessing and presenting additional detailed information from the dynamic business data associated with the particular vehicle represented by the instance of the symbol interacted with by the user in the map-based application, wherein the configuration file defines the at least one event and types of interactions associated with each application part, and wherein an event handler in the second application executes the at least one event in response to the interaction by the user and provides the additional detailed information using the configuration file.

14. The system of claim 13, wherein inserting the instance of the symbol for each application part based on the accessed dynamic business data from the second application comprises inserting a plurality of symbols into the map-based application for at least one of the application parts, the plurality of symbols associated with a plurality of instances of the application part as determined based on the accessed dynamic business data.

15. The system of claim 13, wherein identifying the configuration file for enhancing the map-based application is based on a pre-defined association with a user of the map-based application.

16. The system of claim 15, wherein the pre-defined association with the user of the map-based application is based on at least one of the user's role, location, or job.

17. The system of claim 13, wherein incorporating the one or more application parts from the identified configuration file into the map-based application is performed during runtime of an instance of the map-based application after prior instantiation of the instance.

18. A computer program product embodied in a non-transitory computer-readable storage medium and comprising instructions that when executed by a processor, cause the processor to perform operations comprising:
identifying a map-based application for enhancement;
identifying a configuration file defining one or more application parts for enhancing the map-based application, the one or more application parts associated with a second application, the second application comprising a transportation management system monitoring real-time locations of a plurality of vehicles; and
incorporating the one or more application parts from the identified configuration file into the map-based application, wherein incorporating the one or more application parts into the map-based application comprises:
identifying a symbol associated with each of the one or more application parts;
accessing, from the second application, dynamic business data that is associated with each of the one or more application parts, wherein the dynamic business data includes a current location of each of the plurality of vehicles; and
inserting an instance of the symbol for each application part based on the accessed dynamic business data from the second application, each instance of the symbol representing a particular vehicle and its current location defined in the second application, wherein inserting the instance of the symbol for each application part includes associating at least one event associated with the second application with each inserted symbol, wherein interaction by a user with the instance of the symbol triggers the at least one event associated with the second application, the at least one event comprising accessing and presenting additional detailed information from the dynamic business data associated with the particular vehicle represented by the instance of the symbol interacted with by the user in the map-based application, wherein the configuration file defines the at least one event and types of interactions associated with each application part, and wherein an event handler in the second application executes the at least one event in response to the interaction by the user and provides the additional detailed information using the configuration file.

* * * * *